US007325210B2

(12) United States Patent
Rao et al.

(10) Patent No.: US 7,325,210 B2
(45) Date of Patent: Jan. 29, 2008

(54) HYBRID LINEAR WIRE MODEL APPROACH TO TUNING TRANSISTOR WIDTHS OF CIRCUITS WITH RC INTERCONNECT

(75) Inventors: Vasant Rao, Fishkill, NY (US); Cindy Washburn, Poughquag, NY (US); Jun Zhou, Austin, TX (US); Jeffrey P. Soreff, Poughkeepsie, NY (US); Patrick M. Williams, Salt Point, NY (US); David J. Hathaway, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 11/077,043

(22) Filed: Mar. 10, 2005

(65) Prior Publication Data

US 2006/0206845 A1    Sep. 14, 2006

(51) Int. Cl.
*G06F 17/50*    (2006.01)
(52) U.S. Cl. .................................. 716/6; 716/2; 703/16
(58) Field of Classification Search .................... 716/6, 716/2; 703/16
See application file for complete search history.

(56) References Cited

U.S. PATENT DOCUMENTS

| 5,359,534 | A | * | 10/1994 | Fujiki et al. | ..................... | 716/6 |
| 5,369,594 | A | * | 11/1994 | Huang et al. | ................... | 716/7 |
| 5,588,142 | A | * | 12/1996 | Sharrit | .......................... | 703/14 |
| 5,808,915 | A | * | 9/1998 | Troyanovsky | ................ | 703/14 |
| 6,209,122 | B1 | * | 3/2001 | Jyu et al. | ....................... | 716/6 |

(Continued)

FOREIGN PATENT DOCUMENTS

EP    736680 A1 *    10/1996

(Continued)

OTHER PUBLICATIONS

Venkatesan et al., "A Physical Model for the Transient Response of Capacitively Loaded Distributed rlc Interconnects", ACM, Jun. 10-14, 2002, pp. 763-765.*

Basel, "Accurate and Efficient Extraction of Interconnect Circuits for Full-Chip Timing Analysis", Microelectronics Communications Technology Producing Quality Products Mobile and Portable Power Emerging Technologies Conference, Nov. 7-9, 1995, pp. 118-123.*

(Continued)

*Primary Examiner*—Phallaka Kik
(74) *Attorney, Agent, or Firm*—H. Daniel Schnurmann (57) ABSTRACT

A hybrid linear wire model for tuning the transistor widths of circuits linked by RC interconnects is described. The method uses two embedded simulators during the tuning process on netlists that contain resistors (Rs). A Timing oriented simulator is used only for timing purposes on the original netlist that includes all the Rs. A Gradient oriented simulator is then run only on the modified netlist with all Rs shorted and within the iterative loop of the tuner to compute gradients. The present hybrid method achieves a significant improvement in computational speed. The Timing oriented simulator is fast and accurate for only timing netlists with Rs, but cannot compute gradients efficiently. The Gradient oriented simulator computes gradients efficiently but cannot do so in the presence of Rs. To prevent "de-tuning" that typically occurs when all Rs are shorted, 'wire-adjusts' are provided that make the initial timing results using the Gradient oriented simulator on the shorted netlist match the timing results using Timing oriented simulator on the original netlist. This permits the optimizer sense initially the correct set of critical timing paths, and more significantly, it permits the wire-adjusts keep track of the changing transistor widths to guide the optimizer during the iterations until convergence is achieved.

13 Claims, 5 Drawing Sheets

U.S. PATENT DOCUMENTS

| | | | |
|---|---|---|---|
| 6,219,631 B1* | 4/2001 | Oh et al. | 703/14 |
| 6,507,936 B2* | 1/2003 | Yamaguchi | 716/6 |
| 6,530,066 B1* | 3/2003 | Ito et al. | 716/5 |
| 6,567,960 B2* | 5/2003 | Chang et al. | 716/5 |
| 6,687,883 B2* | 2/2004 | Cohn et al. | 716/4 |
| 6,789,248 B1* | 9/2004 | Lu et al. | 716/18 |
| 6,807,520 B1* | 10/2004 | Zhou et al. | 703/14 |
| 6,940,293 B2* | 9/2005 | Ramarao et al. | 324/677 |
| 2002/0016952 A1* | 2/2002 | Chang et al. | 716/18 |
| 2003/0070148 A1* | 4/2003 | Chang et al. | 716/5 |
| 2003/0126573 A1* | 7/2003 | Roohparvar | 716/10 |
| 2004/0044510 A1* | 3/2004 | Zolotov et al. | 703/14 |
| 2004/0059558 A1* | 3/2004 | Korobkov | 703/14 |
| 2004/0148579 A1* | 7/2004 | Visweswariah | 716/2 |
| 2005/0102124 A1* | 5/2005 | Root et al. | 703/14 |
| 2005/0149895 A1* | 7/2005 | Toubou | 716/6 |
| 2006/0149526 A1* | 7/2006 | Torossian et al. | 703/16 |

FOREIGN PATENT DOCUMENTS

| | | | |
|---|---|---|---|
| JP | 11135388 A | * | 5/1999 |

OTHER PUBLICATIONS

Nakayama et al., "A Learning Algorithm for Convolutive Blind Source Separation with Transmission Delay Constraint", IEEE, 2002, pp. 1287-1292.*

Kurogi et al., "Competitive Learning Using Gradient and Reinitialization Methods for Adaptive Vector Quantization", Proceedings of the 2000 IEEE Signal Processing Society Workshop, vol. 1, Dec. 11-13, 2000, pp. 281-288.*

Lee et al., "Synthesis of High-Speed Interconnects Under Constraints on Tlming and Slgnal Integrity", IEEE 1998 Electronic Components and Technology Conference, 1998, pp. 622-626.*

Chng et al., "Gradient Radial Basis Function Networks for Nonlinear and Nonstationary Time Series Prediction", IEEE Transactions on Neural Networks, VOl. 7, No. 1, Jan. 1996, pp. 190-194.*

NN9201216, "Transistor Size Optimization for Circuit Cells of VLSI", IBM Technical Disclosure Bulletin, vol. 34, No. 8, Jan. 1992, pp. 216-220 (6 pages).*

"Adaptively Controlled Explicit Simulation" Anirudh Devgan Member, IEEE, and Ronald A. Rohrer, Fellow, IEEE, IEEE Transactions on Computer-Aided Design of Integrated Circuits and Systems, vol. 13, No. 6, Jun. 1994, pp. 746-761.

"Piecewise Approximate Circuit Simulation" Chandramouli Visweswariah, Member IEEE and Ronald Rohrer, Fellow IEEE, IEEE Transactions on Computer-Aided Design vol. 10 No. 7 Jul. 1991 pp. 861-870.

"Gradient-Based Optimization of Custom Circuits Using a Static-Timing Formulation" A.R. Conn, I.M. Elfadel, W.W. Molzen Jr., P.R. O'Brien, P.N. Strenski, C. Visweswariah, C.B. Whan, ACM, 1999, 8 pages.

* cited by examiner

$$\min [\max ( AT_7, AT_8 )]$$

s.t. $AT_7 = \max [AT_5 + d_{57}, AT_6 + d_{67}]$ s.t. $AT_8 = \max [AT_5 + d_{58}, AT_6 + d_{68}]$ s.t. $AT_5 = \max [AT_1 + d_{15}, AT_2 + d_{25}]$ s.t. $AT_6 = \max [AT_3 + d_{36}, AT_4 + d_{46}]$

Original Netlist with Rs and Cs

Netlist with all Rs shorted

FIG. 5b

HYBRID LINEAR WIRE MODEL APPROACH TO TUNING TRANSISTOR WIDTHS OF CIRCUITS WITH RC INTERCONNECT

BACKGROUND OF THE INVENTION

This invention is related to the field of Electronic Design Automation, and more particularly, to a method for optimizing the widths of transistors in an integrated circuit (IC) while accounting for the effect of the interconnect resistors and capacitors (RC) on the timing of the circuit.

Integrated circuits are typically modeled to perform electrical analysis using for this purpose a netlist of transistors (referred to hereinafter as switching devices) interconnected by linear circuit elements, such as resistors (Rs) and capacitors (Cs). The widths of the transistors affect the performance (speed, area, power, etc.) of the circuit. The so-called 'Transistor Widths Tuning' problem involves assigning optimal values to the transistor widths to achieve the best possible performance, such as minimal area, minimal cycle time, and the like.

Figure 1:
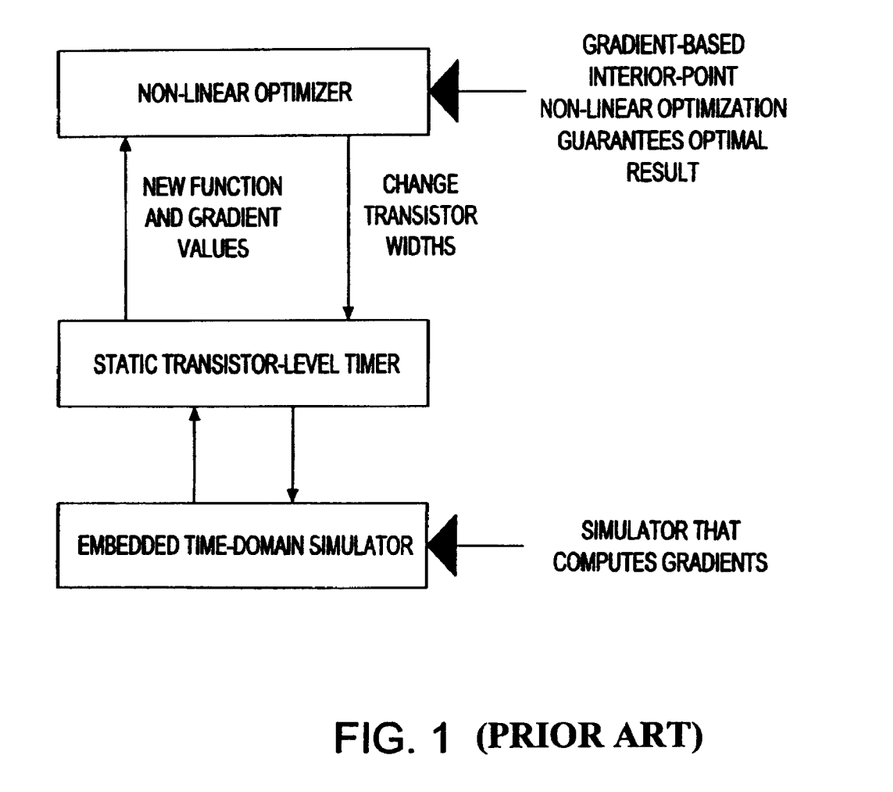
FIG. 1 is a high-level view of the main components of a prior art tuner.
Figure 2:
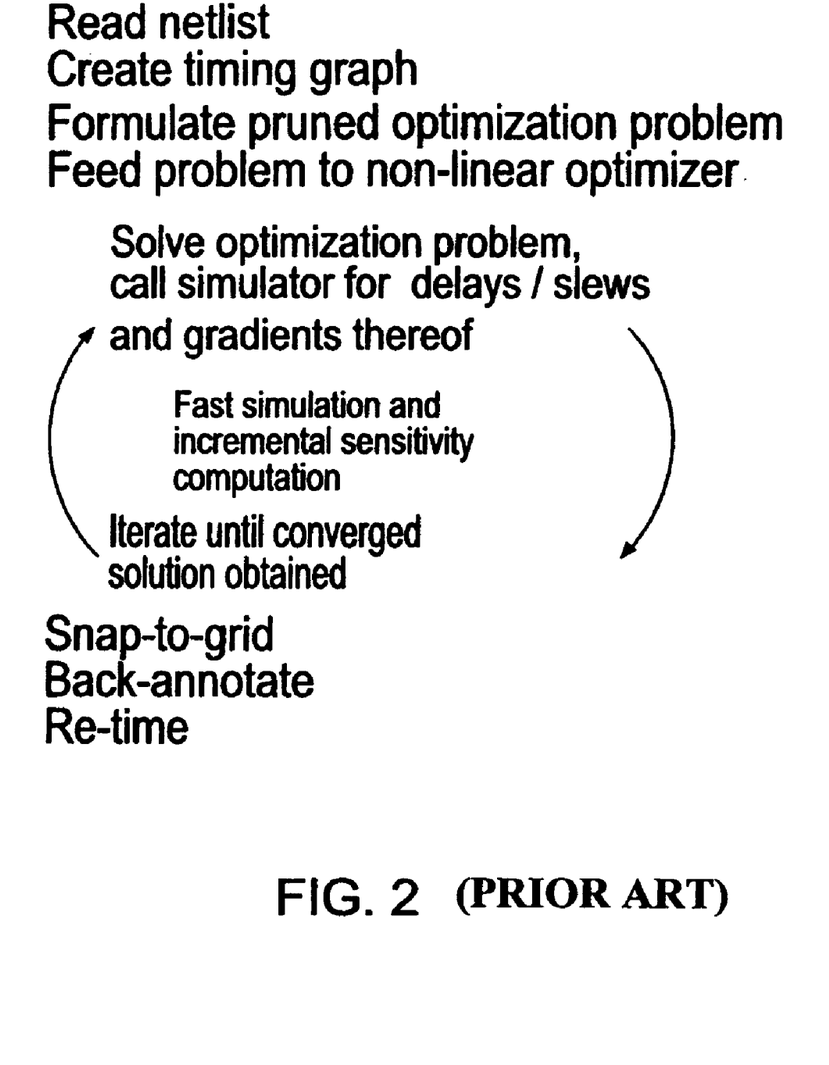
FIG. 2 is a high-level representation of the major steps of the prior art tuner.

A variety of approaches has been used in industry to solve the tuning problem. One approach utilizes a general gradient-based non-linear optimizer as shown in FIG. 1. The major steps of the optimizer are outlined in FIG. 2. A netlist is read, and based thereon a static transistor level timer constructs a timing graph. The tuning problem is addressed as a general non-linear optimization problem characterized by a possibly non-linear objective function and non-linear constraints. The widths of the transistors are the variables of the problem. The objective function encompasses a combination of performance metrics applicable to the circuit being designed, such as cycle-time, area, power, and the like. The cycle-time defines the longest path delay. The delay of a stage on the path is generally a non-linear function of the widths of the transistors within the stage, the slew (i.e., the time taken for a signal to rise or fall from a first threshold value to a second threshold value) at the stage input, and the capacitive load of the next stage on the path. Thus, the cycle-time is a non-linear function of the variables of the problem.

Various constraints are included in the optimization problem posed to the non-linear optimizer. Some of these constraints enforce certain relationships between the variables and non-linear functions of the problem, for example requiring that the arrival time (AT) variable at the output of a stage is not less than the AT variable at the input of the stage plus the non-linear function which computed the delay through the stage. Other constraints may enforce design requirements on the final optimization result, such as limits on the area, delay, or power of the design. An iterative process begins after describing the problem to the non-linear optimizer. During each iteration, given a set of variable values, the optimizer requires function values and gradients (partial derivatives) for each non-linear function. The static timer uses an embedded time-domain circuit simulator that computes the values and returns them back to the optimizer which changes the values of the variables. The entire process is repeated until convergence is achieved.

Figure 3:
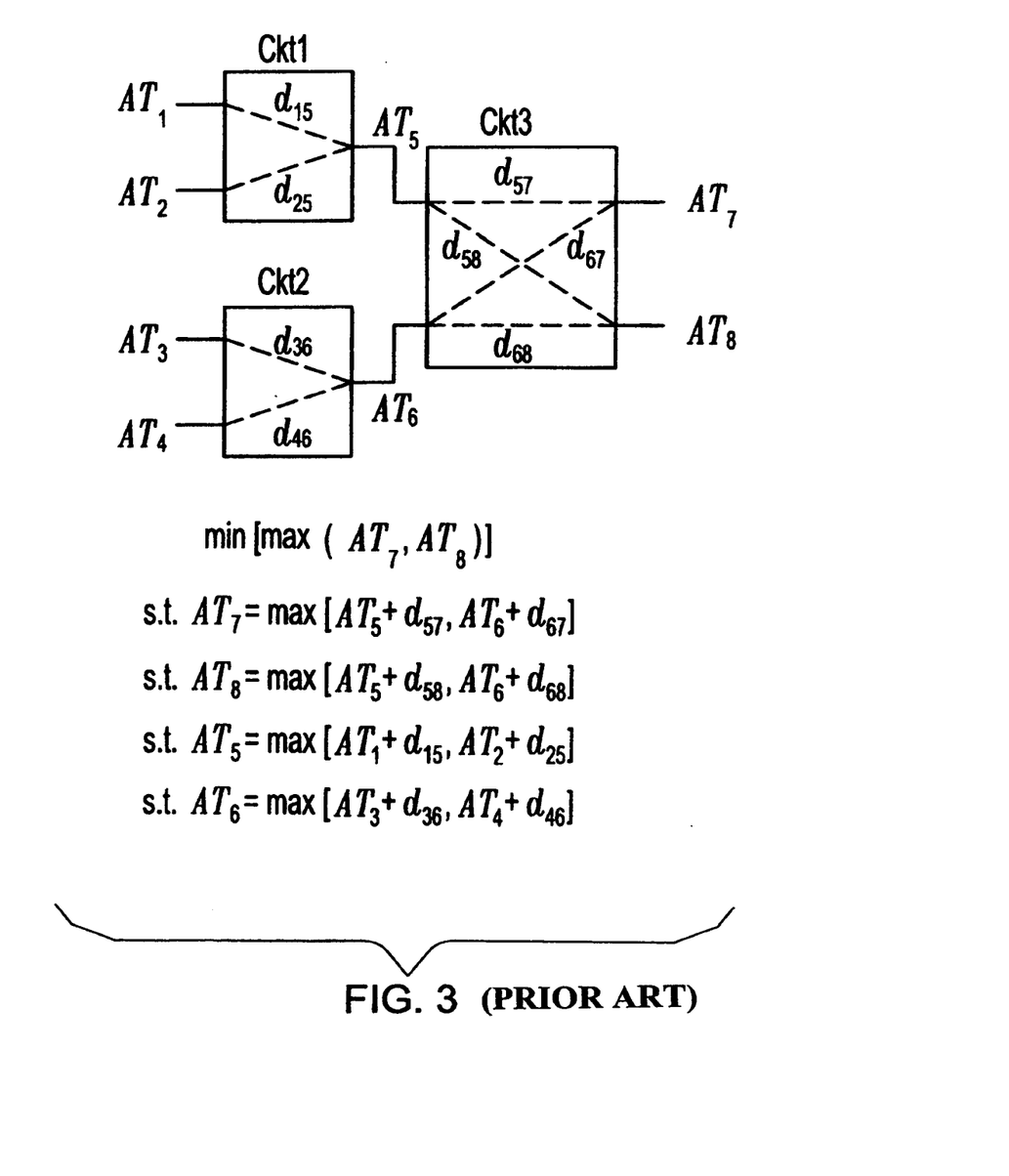
FIG. 3 is a description of a simple optimization problem generated by the prior art tuner.

A simple example of an optimization problem is illustrated in FIG. 3. Shown are three gates having a delay $d_{ij}$ from node i to node j modeled as non-linear functions of the widths of the transistors within the gates. The arrival times $AT_{1,2,3,4}$ at the inputs are assumed for purposes of explanation to be zero, but may also be non-zero values specified by the designer. The objective is to minimize the longest path delay $\max(AT_7, AT_8)$ subject to the four constraints shown.

Details of the gradient-based method for tuning transistor widths are described in an article by A. R. Conn, et al., Gradient-based optimization of custom circuits using a static-timing formulation, *Proc. Design Automation Conference*, pages 452-459, June 1999.

In early (pre-layout) stages of the design process and in past technologies it was possible to model interconnect wires with reasonable accuracy by way of capacitors (Cs) and no resistors (Rs). In such an instance, the tuner uses a fast embedded circuit simulator that not only computes certain time-domain metrics such as delay (difference between mid-point crossing times of an output signal and an input signal) and slew (difference between high-point and low-point crossing times) of an output signal by performing a time-domain transient analysis of the circuit (to be referred hereinafter as 'timing'), but which also computes sensitivities of those time-domain metrics with respect to the variations of the transistor widths, slew at an input, and load capacitance. Several fast circuit simulators capable of providing this information exist both within academia and commercial vendors.

In current technologies, circuit designers have found that ignoring the resistance (R) of the interconnect wiring when tuning the widths of the transistors causes unacceptable loss of accuracy. The delay of the interconnect (referred to hereinafter as RC delay) is becoming more significant as devices become smaller, as the technology advances, and as the design cycle time is pushed to even faster limits. To this end, the tuner may no longer neglect the interconnect resistance. Unfortunately, the presence of Rs in the interconnections is a major obstacle when using currently available embedded simulators either during timing or during the sensitivity computation.

Of late, a transistor level static timer using an embedded simulator has been successfully employed. A description thereof is found in an article by A. Devgan and R. A. Rohrer, Adaptively controlled explicit simulation, *IEEE Transactions on Computer-Aided Design of Integrated Circuits and Systems*, vol. CAD-13(6), pp. 746-762, June 1994, referred to hereinafter as the Timing oriented simulator, primarily because it works well (both fast and accurate) in timing circuits that include Rs in the interconnects. Note that a static transistor-level timer requires the embedded simulator to only perform timing and not to perform sensitivity calculations. Unfortunately, while this simulator is fast and accurate when used for timing circuit with Rs, it is too slow and inaccurate to use for computation of sensitivities in such circuits. Accordingly a Timing oriented simulator cannot be used by the tuner. In the absence of Rs, the tuner uses an embedded simulator described by C. Visweswariah and R. A. Rohrer, Piecewise approximate circuit simulation, *IEEE Transactions on Computer-Aided Design of Integrated Circuits and Systems*, vol. CAD-7(6), pp. 659-667, June 1988 which shall be referred henceforth to a Gradient oriented simulator, primarily because it computes both timing and sensitivities quickly and accurately for circuits without any Rs. Unfortunately, the Gradient oriented simulator is too slow even for timing circuits when Rs are present.

A problem remains unresolved in that no embedded simulators exist that are sufficiently fast and accurate for performing both timing and sensitivity calculations on circuits in the presence of Rs in the interconnect wiring. One is therefore faced with the daunting task of running the tuner on netlists generated by circuit extractors wherein the interconnect wiring is modeled by way of a large number of interconnect elements that includes both Rs and Cs, in addition to transistors. Often, the number of Rs exceeds many times the number of transistors, and the R values are spread across a large dynamic range. The large number of Rs increases the size of the circuit sent to the embedded simulator while the wide dynamic range in the resistor values causes a phenomenon know as stiffness in the differential equations solved by the simulator, leading to a significant slow-down in the simulator. The slowdown due to stiffness is dominant, especially in simulators like the Gradient oriented simulator that use explicit numerical integration methods.

OBJECTS AND SUMMARY OF THE INVENTION

Accordingly, it is an object of the invention to optimize the widths of transistors in an integrated circuit while accounting for the effect on the circuit timing of the parasitic RC networks interconnecting the transistors.

It is another object to perform the above mentioned optimization in a speedy manner without significant loss of accuracy.

The present invention fully utilizes the strengths and hides the weaknesses of both types of embedded circuit simulators: the Timing oriented simulator that efficiently performs the transient analysis of a circuit including resistors used in the pre-tuning phase, and the Gradient oriented simulator that efficiently computes, in the iterative tuning phase, the sensitivities (or gradients) in a circuit devoid of resistors. The invention uses the results of the pre-tuning phase to correct the effect of the Rs in the interconnect wiring ignored during the tuning phase.

Since there is no suitable embedded simulator within the tuner to run directly on an extracted RC netlist, a 'hybrid' approach is described wherein all the parasitic interconnects are accounted for during the circuit optimization phase by exploiting the strengths of both types of available embedded simulators, namely, a Timing oriented simulator which is fast and accurate for timing circuits that include Rs (even with a wide dynamic range in values) as long as it is not required to compute sensitivities, and a Gradient oriented simulator which is fast and accurate for both timing and sensitivity calculations as long as no Rs are present in the circuit being analyzed.

BRIEF DESCRIPTION OF THE DRAWINGS

These and other objects, aspects and advantages of the invention will be better understood from the detailed preferred embodiment of the invention when taken in conjunction with the accompanying drawings.

DETAILED DESCRIPTION OF THE INVENTION

Figure 4:
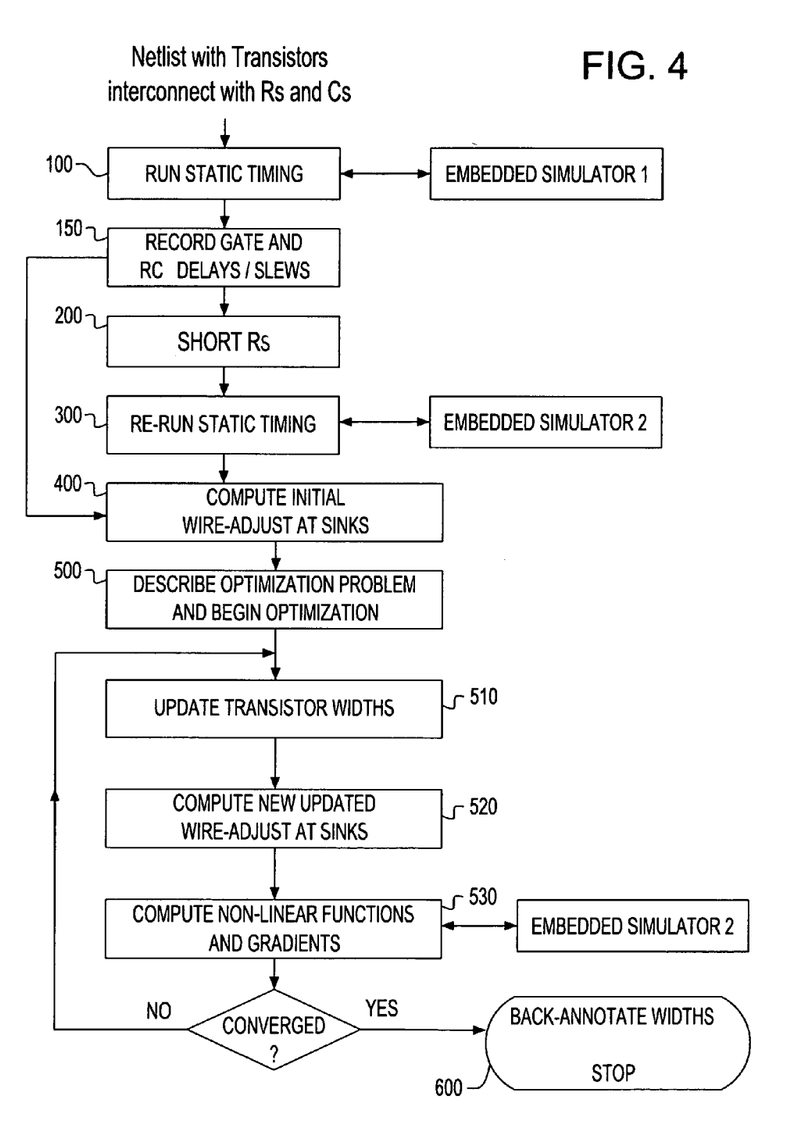
FIG. 4 is a flow chart describing the hybrid approach, in accordance with the present invention.

Referring now to FIG. 4, there is shown a flow chart outlining the various steps of the 'hybrid' simulator approach of the present invention. The method detailed hereinafter is applied to a circuit design described by a netlist that includes interconnect wiring that includes both Rs and Cs.

In step 100, a static transistor-level timer for timing the netlist computes the timing information by running the Timing oriented simulator (also referred to, for simplicity, as Simulator 1).

In step 150, in an operation referred to as the pre-tuning phase, the gate delay and slew and RC delay and slew information of each stage is recorded. The gate delay is the delay from the stage input to the output node of the gate. An RC delay is the delay from the gate output (which is also the source node of the interconnect network) to a net sink, and there will generally be a different RC delay for each net sink. The widths of all the transistors become the initial values of the netlist.

In step 200, all the Rs of the netlist are shorted to allow the tuner execute the Gradient oriented simulator.

In step 300, a new timing is computed by way of the Gradient oriented simulator (for simplicity also referred to as Simulator 2). Since no Rs exist any longer in the netlist, the design will not display any RC delays.

Next, in step 400, an initial 'wire-adjust' term is computed for the basic gate delay and slew generated by the gradient oriented simulator using the gate and the RC delay and slew computed previously in step 150. Each sink pin of the net is assigned a corresponding wire-adjust term. The main requirement for the wire-adjust is that it model the RC delay to the sink, track changes in capacitance at the sink. Most importantly, it provides a simple calculation that does not require an elaborate sensitivity simulation, specially for a circuit where both Rs and Cs are present alongside with the transistors. Details of how the wire-adjust (i.e., the essence of the invention) satisfies all these properties will be discussed in the next.

The process proceeds by describing the optimization problem to the non-linear optimizer in step 500 and then by solving the optimization problem during the optimization or tuning phase comprising steps 510, 520, and 530. This process is iterative, as previously described. In each iteration, the optimizer uses previously computed function and gradient values to change the widths of the transistors (step 510), triggering a recomputation of the new function and gradient values (step 530) using the embedded Gradient oriented simulator. It is worth noting that during this process there are no resistors in the netlist present any longer since they were all shorted in step 200. It is therefore evident that using the Gradient oriented simulator for computing gradients is both practical and efficient.

Step 520 is a crucial step since it accounts for the effect of Rs on the delay and the slew at each sink of each net. In the absence of this step, the optimizer would essentially ignore the effect of the Rs and would converge to an inaccurate solution. The initial wire-adjust computed previously in step 400 is updated because, in step 400, all the transistor widths were at their initial values and the most recently computed transistor widths in step 510 are required to update the wire-adjusts. Steps 510, 520, and 530 are repeated until convergence is achieved, in which case, the netlist is updated with the new optimized transistor widths (Step 600), and the program comes to a stop.

A wire-adjust function which accounts for the effect of the Rs on the delay and slew at the sink of a net can be viewed in its simplest form as the sum of two terms. The first term is the difference between the gate delay computed by the Timing oriented simulator (in step 150) and the gate delay currently computed by the gradient oriented simulator (in step 300). This term is a constant and is computed from the initial pre-tuned transistor width. It accounts for the difference between the two embedded simulators. Generically, the second term is a model of the RC delay. In the present embodiment, this term is the product of a constant times the capacitance at the sink being modeled. Note that as the tuner iterations progress, the capacitance at each sink is likely to change since the widths of the transistor(s) whose gate pins are connected to this sink are likely to change during the iterative optimization process. The constant in the second term ideally represents the sensitivity of the RC delay to the sink that is modeled with respect to the capacitance at that sink averaged across the range of capacitances likely to be encountered at the sink in the course of the tuner optimization.

Since any sensitivity in the presence of Rs is expensive to compute, one may advantageously approximate it by the product of the RC delay computed by the Timing oriented simulator at the initial pre-tuned widths in step 100 times the ratio of the sink capacitance in the current iteration, divided by the sink capacitance computed at the pre-tuned width. Note that the simplest form of the second term is a linear function of the capacitance at the sink of the form $bC_{sink}^k$, wherein $C_{sink}^k$ represents the capacitances at the sink during the $k^{th}$ iteration of the tuner, and b is a constant that remains unchanged during the iterative process. By way of example, b may be selected to be the ratio of the RC delay to the sink computed by the Timing oriented simulator, divided by the capacitance at the sink having the pre-tuned width, resulting in the following formula for the wire-adjust at the sink.

$$\text{Delay\_Adjust}_{sink}^k = \left( \frac{\text{Gate\_Delay}^{Simulator1} - }{\text{Gate\_Delay}^{Simulator2}} \right) + \frac{\text{RC\_Delay}_{sink}^{Simulator1}}{C_{sink}^0} \times C_{sink}^k \quad (1)$$

Wire-adjusting for the difference between the slew at the sink and the slew at the source could similarly be computed by simply replacing 'Delay' by 'Slew' in Equation (1). Note that since the RC delay to each sink of a net will in general be different, a separate wire-adjust value may be computed for each sink of the net.

A more general and accurate form of modeling the second term may be an affine (linear) function of the form $a+bC_{sink}^k$, where the constants a and b are precomputed in step 150 using an advanced linear RC circuit analysis tool capable of computing sensitivities. Note that the emphasis is on 'linear' and it does not require a simulator to compute the sensitivities. The wire-adjust term may be extended to account for the dependence of RC delay and slew at the sink on the slew at the source of the net as well as capacitances at other sinks of the net, and the like, by obtaining from the advanced linear RC circuit analysis tool derivatives of the RC delay and slew with respect to these parameters, and adding to the delay adjust formula terms which are the products of these sensitivities times the differences between their respective parameters values in the $k^{th}$ iteration and in the pre-tuned netlist.

Moreover, the wire-adjust term may be modified to account for some fairly easily determined nonlinearities in the RC delay to the sink, notably the asymptotic approach of the term $bC_{sink}^k$ to $\ln(2)R_{path}C_{sink}^k$ for a large $C_{sink}^k$ value, wherein $R_{path}$ is the wire resistance on the path from the driver of the net to a specific sink. For example, the asymptotic behavior could be modeled by generalizing $a+bC^{sink^k}$ with fixed b to allow b be a function of $C_{sink}^k$, e.g. $b(C_{sink}^k)=b_0+(\ln(2)R_{path}-b_0)(\tanh(C_{sink}^k/C_{asympt}))$, where $b_0$ is the b value computed without any asymptotic correction, and $C_{asympt}$ is the sink capacitance at which asymptotic effects dominate. This $C_{asympt}$ will typically be approximately $slew_0/R_{path}$, where $slew_0$ is the slew at this sink in the original simulation using the pre-tuned netlist.

An alternative model for the slew at the sink of a net could be $$Slew_{sink} = \sqrt{\begin{array}{c}(Slew_{source}^{Simulator2})^2 + \\ [(Slew_{sink}^{Simulator1})^2 - (Slew_{source}^{Simulator1})^2] \times \\ (C_{sink}^k / C_{sink}^0)^2\end{array}}$$

which is derived from a variance-based formula commonly used in practice.

An important consideration is that the model of the wire-adjust should not become so complicated as to overwhelm the tuner or stress the embedded simulator. Another important consideration is that the model be continuous and have continuous derivatives, or sensitivities, as the optimizer may otherwise fail to converge to a valid solution.

Another method for accounting for the dependence of the source-to-sink delay of the RC net on the load capacitance and which applies best to RC-tree networks will now be described. Because interconnect networks in integrated circuits are often RC-trees, such a method is often directly applicable. For non-tree networks, one may utilize a minimal resistive spanning tree having the smallest total resistance. Well-known graph algorithms such as Prim's or Kruskal's are advantageously used for this purpose. Such a spanning tree selection will necessarily omit certain resistors of the original network, and should omit only the larger link resistors that generate a lesser error in the Elmore delay (well known to one skilled in the art of linear RC networks) to a given sink. When accounting for the dependence of the source-to-sink delay of the RC net on the load capacitance, it is important to consider not only the sensitivity of the net delay to the capacitance of the particular sink to which the delay is being measured, but also its sensitivity to the capacitance of other sinks of the net. Otherwise, the tuning process may increase the loading on one or more of these side inputs and fail to properly model the effect of this increased loading on the delay to the particular sink. To this end, one computes the Elmore delay of the initial network for each sink, and the sensitivity of each of those delays to all of the sink loads. For an RC-tree network, Elmore delay sensitivities are trivially computed (i.e. the sensitivity of the delay to sink i on the load of sink j is merely the sum of the resistances on the common part of the paths from the root of the tree to sink i and from the root to sink j), whereas for non-trees, one simply approximates these sensitivities from the aforementioned minimal spanning tree. Since the Elmore delay is only an approximation of the actual RC delay, the sensitivity of the actual RC delay becomes the computed Elmore delay sensitivity scaled by the ratio between a more accurately calculated RC delay (e.g., using the Timing oriented simulator) and the Elmore delay of the sink, and are used as constant sensitivities during tuning. Thus, the sensitivity of the RC delay at sink i to the load $C_j$ at sink j are:

$$\frac{\partial RC\_Delay_i}{\partial C_j} = \frac{RC\_Delay_i^{Simulator1}}{Elmore\_Delay_i} \times \frac{\partial Elmore\_Delay_i}{\partial C_j}. \quad (2)$$

During tuning the RC delay to sink i is then computed as:

$$RC\_Delay_i^k = RC\_Delay_i^{Simulator1} + \sum_{all\ sinks\ j}(C_j^k - C_j^0) \times \frac{\partial RC\_Delay_i}{\partial C_j} \quad (3)$$

Overestimating these sensitivities due to ignorance of the shielding effects of side branch resistances is always possible. Other refinements may be added to adjust for these sensitivities to reduce overestimation.

Figure 5A:
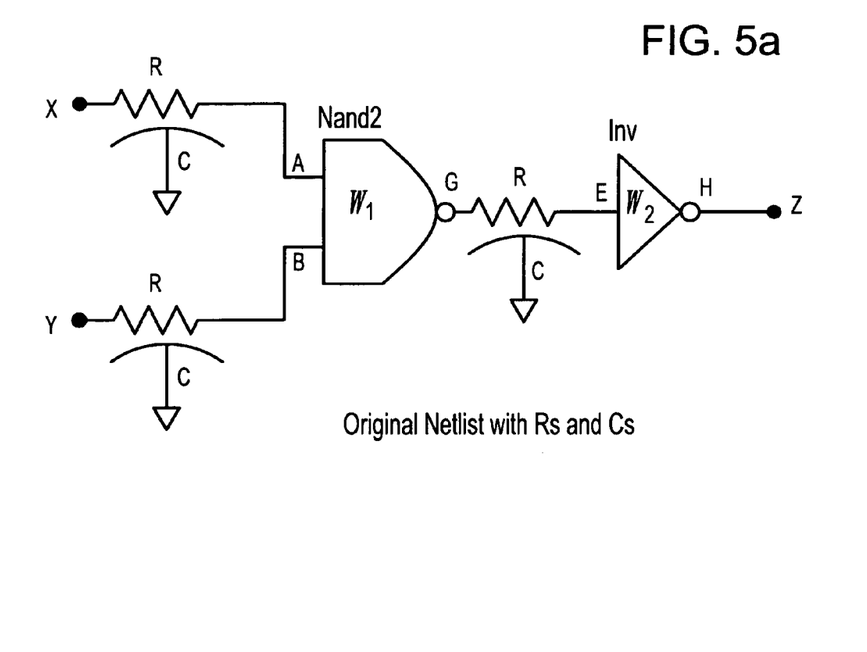
FIGS. 5a and 5b illustrate an example that describes the details of the hybrid approach of the present invention.

Referring now to FIG. 5(a), there is shown an exemplary circuit to further illustrate the hybrid approach of the present invention.

The original netlist consists of a 2-input NAND gate (Nand2) and an inverter (Inv) connected by way of Rs and Cs. The precise electrical model for the layout is not shown for simplicity. A total capacitance of C=10 femtofarads (fF) and a total resistance of R=500 ohms for each net is assumed, though in practice, each net take different R and C values. There are two primary inputs, X and Y, and one primary output Z. Assuming that the arrival times (defined as the time at which a signal crosses the mid-point denoted, henceforth, by t), at the primary inputs are $t_X=0$, $t_Y=10$ picoseconds (ps), and the slews (defined as the difference in the high-point and low-point crossings and referred hereinafter as s), are $s_X=50$, $s_Y=30$ ps. Even though Nand2 has four transistors (two N-type transistors in series in the pull-down stack and two P-type transistors in parallel in the pull-up stack), it is assumed, for simplicity that they all have the same width, referred by $w_1$.

Similarly, it is assumed that both transistors in Inv have the same width $w_2$ and that the initial widths in the netlist of FIG. 5(a) are $w_1=w_2=10\mu$. Further, let $C_Z=100$ fF at the output pin Z. The transistor-level static timer (Step 100 with Timing oriented simulator) is now executed to obtain:

TABLE 1

Initial Timing Results

| Node | T | S |
|---|---|---|
| X | 0 | 50 |
| Y | 10 | 30 |
| A | 15 | 55 |
| B | 25 | 35 |
| G | 40 | 40 |
| E | 50 | 50 |
| H | 60 | 45 |
| Z | 60 | 45 |

In step 150, the individual gate and RC delays computed by the Timing oriented simulator are recorded as:

$RC\_Delay_A^{Simulator\ 1} = t_A - t_X = 15$, $RC\_Slew_A^{Simulator\ 1} = s_A - s_X = 5$ $RC\_Delay_B^{Simulator\ 1} = t_B - t_Y = 15$, $RC\_Slew_B^{Simulator\ 1} = s_B - s_Y = 5$ $Gate\_Delay_{A \to G}^{Simulator\ 1} = 10$, $Slew_{A \to G}^{Simulator\ 1} = 40$ $Gate\_Delay_{B \to G}^{Simulator\ 1} = 15$, $Slew_{B \to G}^{Simulator\ 1} = 30$ $RC\_Delay_E^{Simulator\ 1} = t_E - t_G = 10$, $RC\_Slew_E^{Simulator\ 1} = s_E - s_G = 10$ $Gate\_Delay_{E \to H}^{Simulator\ 1} = 10$, $Slew_{E \to H}^{Simulator\ 1} = 45$ The RC_Delay and RC_Slew on output pin Z is 0, since there are no Rs in the connection from H to Z.

Figure 5B:
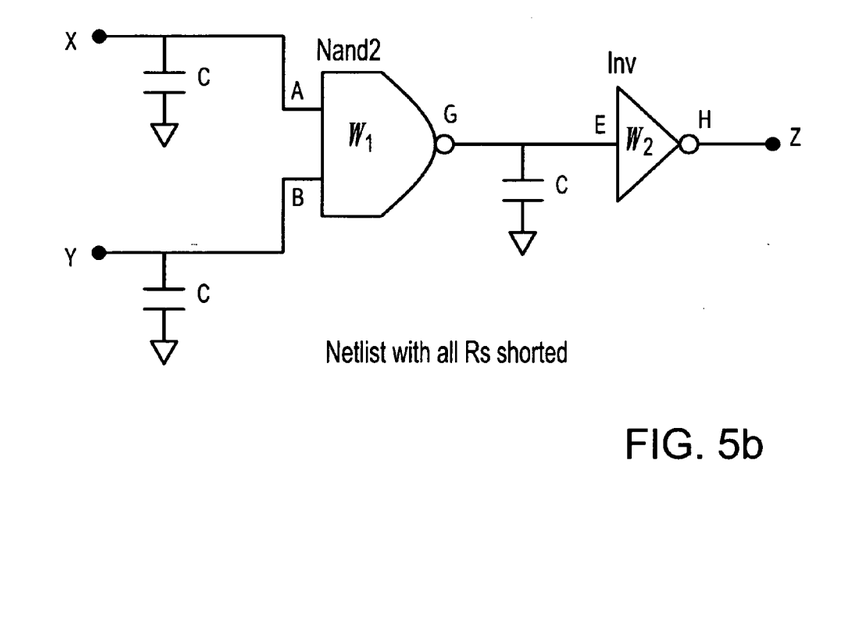

Let it be assumed that the embedded simulator uses a linear model for the input pin capacitance of the form $C_{sink} = \gamma w$, and that $\gamma = 5$ fF/$\mu$. Then, $$C_A = C_B = 5w_1,\ C_E = 5w_2, \quad (4)$$

resulting in an initial pin capacitance of 50 fF at each of the nodes A, B, and E. Step 200 is executed by shorting all the interconnect resistors, resulting in the network shown in FIG. 5(b). In Step 300, a static timing is re-run, now with the Gradient oriented simulator (Note: the execution of steps 300 and 400 is interleaved, gate by gate, as described below), and in step 400 the adjusted values are computed as follows:

First, the RC effects on the propagation from X to A need to be accounted for. Using Equation (1) and neglecting the first term (since there is no gate connected to the source X)

$$Delay\_Adjust_A^0 = \frac{RC\_Delay_A^{Simulator1}}{C_A^0} \times C_A^0 = 15,$$

$$Slew\_Adjust_A^0 = \frac{RC\_Slew_A^{Simulator1}}{C_A^0} \times C_A^0 = 5$$

The arrival time at input X is asserted to be 0 and the slew is 50. Since there are no Rs (having all been shorted), normally, the Gradient oriented simulator will propagate these arrival time and slew values directly to node A. However, in the hybrid approach of the invention, one may advantageously apply the above wire-adjusts to obtain an arrival time at A to be 0+15=15 ps, and a slew at A to be 50+5=55 ps, which coincides thus far with the results from the Timing oriented simulator at the initial width. Similarly for node B $$Delay\_Adjust_B^0 = \frac{RC\_Delay_B^{Simulator1}}{C_B^0} \times C_B^0 = 15,$$

$$Slew\_Adjust_B^0 = \frac{RC\_Slew_B^{Simulator1}}{C_B^0} \times C_B^0 = 5$$

resulting in an arrival time at B (after wire-adjusts) of 10+15=25 ps and a slew at B of 30+5=35 ps, that agrees with the Timing oriented simulator.

The slews of 55 ps at node A and 35 ps at node B are applied and Nand2 is simulated having $w_1=10\mu$ with the Gradient oriented simulator loaded by a total capacitance of $C+C_E^0=10+50=60$ fF.

Assuming now that the simulation results in $Gate\_Delay_{A \to G}^{Simulator\ 2} = 10.6$, $Slew_{A \to G}^{Simulator\ 2} = 39.5$ $Gate\_Delay_{B \to G}^{Simulator\ 2} = 15.5$, $Slew_{B \to G}^{Simulator\ 2} = 29.3$ it is noted that the results do not agree with those of the Timing oriented simulator. There are two main reasons for this. First, the two embedded simulators are different and use different numerical algorithms. Second, the Gradient oriented simulator does not see any resistance at the output of the Nand2 gate, while the Timing oriented simulator may be experiencing some 'resistive shielding'. Since $$t_A + \text{Gate\_Delay}_{A \to G}^{Simulator\ 2} = 15 + 10.6 = 25.6 < t_B + \text{Gate\_Delay}_{B \to G}^{Simulator\ 2} = 25 + 15.5 = 40.5,$$

the static timer selects the propagation from B to G to be the 'winner' (assuming a LATE mode static timing) and declares that $\text{Gate\_Delay}_G^{Simulator\ 2} = \text{Gate\_Delay}_{B \to G}^{Simulator\ 2} = 15.5$ Ps. Note that $\text{Gate\_Delay}_G^{Simulator\ 1} = \text{Gate\_Delay}_{B \to G}^{Simulator\ 1} = 15.0$ ps.

The present embodiment of the invention freezes the winner of the propagations from A to G and B to G, as the propagation from B to G for the Timing oriented simulator in step 100. Alternative embodiments may either capture both propagations to G in step 100 or may revisit the propagation from A to G in the Timing oriented simulator during step 530, if the analysis of propagations A to G and B to G in the Gradient oriented simulator shows that the 'winning' propagation has changed.

Similarly, for the slews, the timer compares the slew of 39.5 from A against the slew of 29.3 from B, and selects the larger value to propagate, namely, 39.5 from A, resulting in $$\text{Gate\_Slew}_G^{Simulator\ 2} = \text{Gate\_Slew}_{A \to G}^{Simulator\ 2} = 39.5 \text{ ps while earlier}$$

$$\text{Gate\_Slew}_G^{Simulator\ 1} = \text{Gate\_Slew}_{A \to G}^{Simulator\ 1} = 40 \text{ ps was computed.}$$

Applying the foregoing and Equation (1) to sink node E (the input to Inv), $$\text{Delay\_Adjust}_E^0 = \left( \begin{array}{c} \text{Gate\_Delay}_G^{Simulator1} - \\ \text{Gate\_Delay}_G^{Simulator2} \end{array} \right) + \frac{\text{RC\_Delay}_E^{Simulator1}}{C_E^0} \times C_E^0$$
$$= (15.0 - 15.5) + 10.0 = 9.5$$

$$\text{Slew\_Adjust}_E^0 = \left( \begin{array}{c} \text{Gate\_Slew}_G^{Simulator1} - \\ \text{Gate\_Slew}_G^{Simulator2} \end{array} \right) + \frac{\text{RC\_Slew}_E^{Simulator1}}{C_E^0} \times C_E^0$$
$$= (40.0 - 39.5) + 10.0 = 10.5$$

Using the adjusts, the arrival time determined by way of the Gradient oriented simulator, at E is 40.5+9.5=50 Ps, while the slew at E becomes 39.5+10.5=50 Ps, which again concurs with the results from the Timing oriented simulator.

Inv, having $w_2 = 10\mu$, is now ready to be sent to the Gradient oriented simulator with an input slew at node E=50 ps and an output load capacitance of $C_H = C_Z = 100$ fF. Assuming that the simulation results in $$\text{Gate\_Delay}_{E \to H}^{Simulator\ 2} = 10.1,\ \text{Slew}_{E \to H}^{Simulator\ 2} = 44.9,$$

even though the connection from H to Z does not have any Rs, i.e., $\text{RC\_Delay}_Z = 0$ and $\text{RC\_Slew}_Z = 0$, one still is required to correct for the Gate_Delay and Gate_Slew differences between the two embedded simulators. Hence, $$\text{Delay\_Adjust}_Z^0 = (\text{Gate\_Delay}_H^{Simulator\ 1} - \text{Gate\_Delay}_H^{Simulator\ 2}) = (10.0 - 10.1) = -0.1$$

$$\text{Slew\_Adjust}_Z^0 = (\text{Gate\_Slew}_H^{Simulator\ 1} - \text{Gate\_Slew}_H^{Simulator\ 2}) = (45.0 - 44.9) = 0.1$$

Thus far, all the initial wire-adjusts (step 400) have been computed, so that all the timing results (arrival times and slews) at the sinks from the Gradient oriented simulator on the netlist with all Rs shorted exactly match the timing results with those of the Timing oriented simulator on the original netlist with the Rs present and with all the transistors at the initial width. This is one of the objectives of the wire-adjust so that, initially, the optimizer is not distracted by focusing on the wrong critical timing paths. A more important reason for the wire-adjusts is that they also account for the changes in the widths of the transistors as the optimization process progresses. The optimization problem posed to the non-linear optimizer will now be described.

There are two basic widths variables $w_1$ and $w_2$ having an initial value=$10\mu$. The slews at nodes G and H, namely $s_G$ and $s_H$ are also optimized variables with initial values of 39.5 and 44.9 ps, since they impact the downstream gate delays and slews. In order to decide the next set of values of these four variables, the optimizer requires gradients of all the non-linear gate delay and slew functions with respect to these four variables.

In the first time step 510, the optimizer uses the initial values of the optimization variables (provided they satisfy the simple bounds). At these initial values, the wire-adjusts are the same as the initial ones computed in step 400, so that no additional work is required in step 520. In step 530, it is assumed that the Gradient oriented simulator computes the following gradients:

$$\frac{\partial Delay_{A \to G}}{\partial w_1} = -0.2 \text{ps}/\mu,$$

$$\frac{\partial Delay_{A \to G}}{\partial s_A} = 0.5,$$

$$\frac{\partial Delay_{A \to G}}{\partial C_G} = 0.1 \text{ps}/fF$$

$$\frac{\partial Delay_{B \to G}}{\partial w_1} = -0.3 \text{ps}/\mu,$$

$$\frac{\partial Delay_{B \to G}}{\partial s_B} = 0.6,$$

$$\frac{\partial Delay_{B \to G}}{\partial C_G} = 0.15 \text{ps}/fF$$

$$\frac{\partial Delay_{E \to H}}{\partial w_2} = -0.25 \text{ps}/\mu,$$

$$\frac{\partial Delay_{E \to H}}{\partial s_E} = 0.55$$

$$\frac{\partial Slew_{A \to G}}{\partial w_1} = -0.1 \text{ps}/\mu,$$

$$\frac{\partial Slew_{A \to G}}{\partial s_A} = 0.9,$$

$$\frac{\partial Slew_{A \to G}}{\partial C_G} = 0.5 \text{ps}/fF$$

$$\frac{\partial Slew_{B \to G}}{\partial w_1} = -0.15 \text{ps}/\mu,$$

-continued $$\frac{\partial Slew_{B \to G}}{\partial s_B} = 0.85,$$

$$\frac{\partial Slew_{B \to G}}{\partial C_G} = 0.5 \text{ps}/fF$$

$$\frac{\partial Slew_{E \to H}}{\partial w_2} = -0.2 \text{ps}/\mu,$$

$$\frac{\partial Slew_{E \to H}}{\partial s_E} = 0.95$$

It is worth noting that explicit references to the Gradient oriented simulator and the prefix 'Gate' have been dropped from the above notation. Further, the derivatives with respect to input slew are dimensionless, since they are the derivative of a time quantity with respect to a time quantity. Moreover, for the E to H propagation, there is no derivative taken with respect to the output load capacitance since the load is constant and does not depend upon the variables of the problem. Finally, as one increases the widths of the transistor, the delays and slews decrease, resulting in negative derivatives. Observing that $$s_A = s_X + \text{Slew\_Adjust}_A$$

$$= 50 + \frac{\text{RC\_Slew}_A^{Simulator1}}{C_A^0} \times C_A$$

$$= 50 + \frac{5}{50} \times 5w_1,$$

with the final equality being provided by Equation (4), it follows that $s_A = 50 + 0.5w_1$. Similarly, $s_B = 30 + 0.5w_1$ and $s_E = s_G + w_2$. Repeating the same operation for the capacitance at the output of Nand2, one arrives at $C_G = C + C_E = 10 + 5w_2$. Now, by chain-ruling all the aforementioned relationships with the gradients returned by the Gradient oriented simulator results in:

$$\frac{d Delay_{A \to G}}{d w_1} = \frac{\partial Delay_{A \to G}}{\partial w_1} + \frac{\partial Delay_{A \to G}}{\partial s_A} \times \frac{\partial s_A}{\partial w_1}$$

$$= -0.2 + 0.5 \times 0.5$$

$$= +0.05 \text{ps}/\mu,$$

$$\frac{d Delay_{A \to G}}{d w_2} = \frac{\partial Delay_{A \to G}}{\partial C_G} \times \frac{\partial C_G}{\partial w_2}$$

$$= 0.1 \times 5 = +0.5 \text{ps}/\mu$$

Note, that while the original partial derivative with respect to width w, was negative, the addition of a second term involving the derivative with respect to the input slew combined with the input slew to the gate depends on the load capacitance at the input pin of the gate, which in turn increases (assumed linearly) with the width $w_1$, resulting in a net positive derivative thereof +0.05. This provides useful information to the optimizer in that it discourages it (as far as only the delay from A to G is concerned) from increasing $w_1$ in the initial iteration. The positive derivative was based on the fact that the wire-adjust factor for slew being used is a function of the load capacitance at the sink. If instead a constant wire-adjust factor for slew were used, the indirect effect that a change in transistor width has on gate delay (through its influence on the input slew of the gate) would not have been modeled, and the derivative seen by the optimizer would have remained negative. The optimizer would therefore have been misled into determining that it would be advantageous to increase w, since it would appear that it would reduce the delay from A to G. However, in the current state, this is probably not advisable since increasing w, also increases the slew at node A due to RC effects. Similarly, for the delay from B to G:

$$\frac{d Delay_{B \to G}}{d w_1} = \frac{\partial Delay_{B \to G}}{\partial w_1} + \frac{\partial Delay_{B \to G}}{\partial s_B} \times \frac{\partial s_B}{\partial w_1}$$

$$= -0.3 + 0.6 \times 0.5$$

$$= 0 \text{ps}/\mu,$$

$$\frac{d Delay_{B \to G}}{d w_2} = \frac{\partial Delay_{B \to G}}{\partial C_G} \times \frac{\partial C_G}{\partial w_2}$$

$$= 0.15 \times 5$$

$$= +0.75 \text{ps}/\mu$$

Note again that the final derivative of delay with respect to $w_1$ is 0. Such an exact cancellation is uncommon due to imprecise floating point arithmetic of the computer running the program, but is possible as shown in the example. Continuing, the slew derivatives are:

$$\frac{d Slew_{A \to G}}{d w_1} = \frac{\partial Slew_{A \to G}}{\partial w_1} + \frac{\partial Slew_{A \to G}}{\partial s_A} \times \frac{\partial s_A}{\partial w_1}$$

$$= -0.1 + 0.9 \times 0.5$$

$$= +0.35 \text{ps}/\mu,$$

$$\frac{d Slew_{A \to G}}{d w_2} = \frac{\partial Slew_{A \to G}}{\partial C_G} \times \frac{\partial C_G}{\partial w_2}$$

$$= 0.5 \times 5$$

$$= +2.5 \text{ps}/\mu$$

$$\frac{d Slew_{B \to G}}{d w_1} = \frac{\partial Slew_{B \to G}}{\partial w_1} + \frac{\partial Slew_{B \to G}}{\partial s_B} \times \frac{\partial s_B}{\partial w_1}$$

$$= -0.15 + 0.85 \times 0.5$$

$$= +0.275 \text{ps}/\mu,$$

$$\frac{d Slew_{B \to G}}{d w_2} = \frac{\partial Slew_{B \to G}}{\partial C_G} \times \frac{\partial C_G}{\partial w_2}$$

$$= 0.5 \times 5$$

$$= +2.5 \text{ps}/\mu$$

Again, notice the switching of the sign of the derivatives with respect to $w_1$. Note that the delay and slew functions for signal propagation from A to G and from B to G depend only on the two widths variables. The derivatives with respect to the two slew variables are therefore 0. Now, moving on to the propagation from E to H whose delay and slew functions depend only on widths $w_2$ and slew variable $s_G$, the derivatives are $$\frac{d Delay_{E \to H}}{d w_2} = \frac{\partial Delay_{E \to H}}{\partial w_2} + \frac{\partial Delay_{E \to H}}{\partial s_E} \times \frac{\partial s_E}{\partial w_2}$$

$$= -0.25 + 0.55 \times 1.0$$

$$= +0.3 \text{ps}/\mu,$$

-continued $$\frac{d\,Delay_{E\to H}}{d\,s_G} = \frac{\partial Delay_{E\to H}}{\partial s_E} \times \frac{\partial s_E}{\partial s_G}$$
$$= 0.55 \times 1.0$$
$$= +0.55,$$

$$\frac{d\,Slew_{E\to H}}{d\,w_2} = \frac{\partial Slew_{E\to H}}{\partial w_2} + \frac{\partial Slew_{E\to H}}{\partial s_E} \times \frac{\partial s_E}{\partial w_2}$$
$$= -0.2 + 0.95 \times 1.0$$
$$= +0.75\ ps/\mu,$$

$$\frac{d\,Slew_{E\to H}}{d\,s_G} = \frac{\partial Slew_{E\to H}}{\partial s_E} \times \frac{\partial s_E}{\partial s_G}$$
$$= 0.95 \times 1.0$$
$$= +0.95,$$

while the remaining derivatives are 0. These final derivatives with respect to the optimizer variables after appropriate chain ruling are returned to the optimizer. Now, step 530 is completed. Since all the derivatives returned to the optimizer are non-negative assuming that the objective reduces the delays and slews, the optimizer is most likely to come up with new transistor widths $w_1$ and $w_2$ in iteration 1 which are less than 10 μm (which was their initial value). In general, at iteration k, the wire-adjusts are updated (step 520) as follows (dropping superscript k=1 for notational simplicity):

$$\text{Delay\_Adjust}_A = \frac{\text{RC\_Delay}_A^{Simulator1}}{C_A^0} \times C_A = 1.5w_1,$$

$$\text{Slew\_Adjust}_A = \frac{\text{RC\_Slew}_A^{Simulator1}}{C_A^0} \times C_A = 0.5w_1,$$

$$\text{Delay\_Adjust}_B = \frac{\text{RC\_Delay}_B^{Simulator1}}{C_B^0} \times C_B = 1.5w_1,$$

$$\text{Slew\_Adjust}_B = \frac{\text{RC\_Slew}_B^{Simulator1}}{C_B^0} \times C_B = 0.5w_1,$$

$$\text{Delay\_Adjust}_E = (\text{Gate\_Delay}_G^{Simulator1} - \text{Gate\_Delay}_G^{Sumulator2}) +$$
$$\frac{\text{RC\_Delay}_E^{Simulator1}}{C_E^0} \times C_E$$
$$= (15.0 - 15.5) + \frac{10}{10} \times w_2 = -0.5 + w_2$$

$$\text{Slew\_Adjust}_E = (\text{Gate\_Slew}_G^{Simulator1} - \text{Gate\_Slew}_G^{Sumulator2}) +$$
$$\frac{\text{RC\_Slew}_E^{Simulator1}}{C_E^0} \times C_E$$
$$= (40.0 - 39.5) + \frac{10}{10} \times w_2 = +0.5 + w_2$$

The wire-adjusts at output Z are constant since they do not depend on the transistor widths. Assuming that the new widths at iteration 1 returned by the optimizer are $w_1$=9μ, $w_2$=7μ. Then the new wire-adjusts at the sinks are:

Delay_Adjust$_A$=1.5×9=13.5 ps Slew_Adjust$_A$=0.5× 9=4 ps,

Delay_Adjust$_B$=1.5×9=13.5 ps, Slew_Adjust$_B$=0.5× 9=4.5 ps,

Delay_Adjust$_E$=−0.5+7.0=6.5 ps, Slew_Adjust$_E$=0.5+ 7.0=7.5 ps.

So, the new arrival times and slews at nodes A and B become:

$t_A$=$t_X$+Delay_Adjust$_A$=0+13.5=13.5 ps, $s_A$=$s_X$+Slew_Adjust$_A$=50+4.5=54.5 ps, $t_B$=$t_Y$+Delay_Adjust$_B$=10+13.5=23.5 ps, $s_B$=$s_Y$+Slew_Adjust$_B$=30+4.5=34 ps, Slews of 54.5 ps are applied at node A and 34.5 ps at node B. Nand2 is simulated having $w_1$=9μ with the Gradient oriented simulator loaded by a total capacitance of C+$C_E$=10+5×7=45 fF. Assuming that the simulation results in:

Gate_Delay$_{A\to G}^{Simulator\ 2}$=8.4, Slew$_{A\to G}^{Simulator\ 2}$=36.2

Gate_Delay$_{B\to G}^{Simulator\ 2}$=12.9, Slew$_{B\to G}^{Simulator\ 2}$=27.1

Note that input slews are roughly the same as in the previous iteration (they were 55 and 35 ps), and the load capacitance at the output node is now reduced from 60 to 45 fF. Thus, the delays and slews obtained from the Gradient oriented simulator are reduced from their original values in the initial iteration. Yet, it is worth noting that the widths of the transistors in Nand2 have been reduced from 10 to 9μ, an indication that the transistors are weaker, causing an increase in the delays and slews at the output. However, since the width $w_2$ of the transistors of Inv has also been reduced, and the effect of the 25% reduction in the load capacitance due to this width reduction is larger than the effect of a 10% reduction in the width w, of the transistors of gate Nand2, it is reasonable to expect a net reduction in the delays and slews returned back from the Gradient oriented simulator, as previously described.

From an arrival time point of view, there are two contenders meeting at node G;

$t_A$+Gate_Delay$_{A\to G}$=13.5+8.4=21.9 ps and $t_B$+Gate_Delay$_{B\to G}$=23.5+12.9=36.4 ps.

The larger arrival time wins and becomes $t_G$=36.4 ps. Similarly, from a slew point of view, the constraints given to the optimizer are that slew variable $s_G \geq$ Slew$_{A\to G}$ and $s_G \geq$ Slew$_{B\to G}$, so that the slew variable at node G must be the larger of 36.2 and 27.1. Accordingly, $t_G$=36.4 and $s_G$=36.2. By applying the updated wire-adjusts at node E results in $t_E$=$t_G$+Delay_Adjust$_E$=36.4+6.5=42.9 ps, $s_E$=$s_G$+Slew_Adjust$_E$=36.2+7.5=43.7 ps.

Inv is simulated next by way of the Gradient oriented simulator using $s_E$=43.7 ps, $w_2$=7μ and $C_H$=$C_Z$=100 fF. Note that the load capacitance is unchanged. The input slew at node E is reduced from 50 to 43.7 ps, while the widths are reduced from 10 to 7μ. Since the widths reduction is more significant than the input slew reduction, it is reasonable to expect that the Gradient oriented simulator returns larger delays and slews at the output of Inv, for instance, Gate_Delay$_{E\to H}$=12.8 and Slew$_{E\to H}$=46.3. Using this, one updates the timing at node H as:

$t_H$=$t_E$+Gate_Delay$_{E\to H}$=42.9+12.8=55.7 ps and $s_H$=Slew$_{E\to H}$=46.3 ps.

After applying the wire-adjusts at the output node Z which are constant since they do not depend upon the transistor widths, the timing information at node Z becomes $t_Z = t_H + \text{Delay\_Adjust}_Z = 55.7 - 0.1 = 55.6$ ps, and $s_Z = s_H + \text{Slew\_Adjust}_Z = 46.3 + 0.1 = 46.4$ ps.

Table 2 below shows the new timing results (on the netlist with all Rs shorted and using the Gradient oriented simulator) after the first iteration within the optimization loop. Compared to Table 1 with the initial timing results (on the original netlist containing the Rs and using the Timing oriented simulator), the results of Table 2 show an improvement in the arrival time at the output (down from 60 to 55.6 ps) even though the widths of all transistors were reduced. Also, the slews at all the nodes are reduced with the exception of nodes H and Z where they increased slightly (from 45 on both to 46.3 and 46.4).

TABLE 2

Timing Results after Iteration 1

| Node | t | s |
|---|---|---|
| X | 0 | 50 |
| Y | 10 | 30 |
| A | 13.5 | 54.5 |
| B | 23.5 | 34.5 |
| G | 36.4 | 36.2 |
| E | 42.9 | 43.7 |
| H | 55.7 | 46.3 |
| Z | 55.6 | 46.4 |

The main reason why the timing improvement is possible even though the transistors were made weaker is attributed to the wire-adjusts. The gradients are recomputed with the new transistor widths, as previously illustrated, and steps 510, 520, and 530 are repeated until convergence is achieved.

In the illustrative example, one may not achieve a significant improvement in timing during the first few iterations of the optimizer; in fact the timing may initially become worse. It is only towards the end of the optimization process that one observes improvements. Also, had the original netlist been timed with Rs using the Timing oriented simulator but with the new transistor widths at the end of iteration 1, the results may not match the numbers shown in Table 2, when using the hybrid method of the present invention. This is because the wire-adjusts at the sinks are only an approximation of the real RC delay and the slew computed by the Timing oriented simulator, apart from the fact that two different embedded simulators rarely give identical results. The initial wire-adjusts computed in step 400 make the initial timing results of step 300 (using the Gradient oriented simulator on a netlist with all Rs shorted) exactly match the results of step 100 (using the Timing oriented simulator on the original netlist with Rs) on all the sinks of the nets. This is only true for the original transistor widths. However, as iterations proceed, the optimizer will change the transistor widths so that the adjusted result from the Gradient oriented simulator may no longer match those of the timing oriented simulator. What is important is that even at the new transistor width, the wire-adjusts 'track' the exact results in that if the widths of transistors at the sink increase, then both the RC delay and slew will also increase. This provides a guide to the optimizer so that it can focus on the real timing critical paths.

After step 600, when the tuner, using the hybrid approach of the present invention terminates, it is advisable to regenerate the netlist with the new transistor widths and with the interconnect RC and simply repeating step 100 (i.e., the static timing by way of the Timing oriented simulator) and evaluating the post-tuning results with the set of timing results.

One may optionally repeat the entire process at this point, computing new wire-adjust functions which exactly match at the new starting point. This effectively re-linearizes the RC delays and slews around the new starting point. Because the initial tuning process will normally have provided a solution which is close to the optimum, only minor changes would be expected in a second tuning process, and the new wire-adjust functions should show little error within the region explored in the second tuning process.

With no wire-adjusts or with constant wire-adjusts tracking the changing widths, the post-tuning timing with the Timing oriented simulator on the updated netlist with Rs usually displays a 'de-tuning', i.e., the timing results typically becomes worse. The wire-adjusts of the inventive method which are a function of the transistor widths model, the effect of the Rs allows the hybrid approach of the present invention to use the Gradient oriented simulator in order to compute the gradients for a circuit with no Rs (i.e., with all the Rs shorted) and yet guide the optimizer to tune the 'right' set of critical paths. This is what makes the problem of tuning circuits with Rs solvable by computer.

In summary, the basic concept of the present invention is to use two embedded simulators during tuning netlists with Rs. The Timing oriented simulator is used only for timing (no gradients) and is run on the original netlist with Rs. The Gradient oriented simulator is run only on a modified netlist with all Rs shorted and is used within the iterative loop of the tuner to also compute gradients. The main advantage of this approach is computational speed; The Timing oriented simulator performs well (i.e., it is fast and accurate) only for timing netlists with Rs, but cannot compute gradients efficiently. The Gradient oriented simulator computes the gradients efficiently, but cannot do so in the presence of Rs. To prevent 'de-tuning' that typically occurs when all Rs are shorted, in a second novel aspect of the invention 'wire-adjusts' are used that make the initial timing results—using the Gradient oriented simulator—on the shorted netlist match the timing results from the Timing oriented simulator on the original netlist. This allows the optimizer to 'see' the correct set of critical timing paths initially, and more significantly, the wire-adjusts track the changing transistor widths to guide the optimizer properly during the various iterations.

A computer is advantageously used for implementing the hybrid approach, in accordance with the embodiments of the present invention. The computer typically includes a processor, an input device coupled to the processor, an output device coupled to the processor, and memory devices each coupled to the processor. The input device may be a keyboard, a mouse, and the like. The output device may be a printer, a plotter, a computer screen, a magnetic tape, a removable hard disk, a floppy disk, etc. The memory devices may be a hard disk, a floppy disk, a magnetic tape, an optical storage such as a compact disc (CD) or a digital video disc (DVD), a dynamic random access memory (DRAM), a read-only memory (ROM), etc. The memory device includes computer code that includes an algorithm for implementing the hybrid approach for tuning the transistor widths of an integrated circuit. The processor executes the computer code. The memory device includes input data. The input data includes input required by the computer code. The output device displays output from the computer code. Either or both memory devices and (or one or more additional memory devices) may be used as a computer usable medium (or a computer readable medium or a program storage device) having a computer readable program code embodied therein and/or having other data stored therein, wherein the computer readable program code comprises the computer code. Generally, a computer program product (or, alternatively, an article of manufacture) of the computer system may include the computer usable medium or program storage device.

Although the computer system may have a particular configuration of hardware and software, any configuration of hardware and software known one of ordinary skill in the art, may be advantageously utilized for the purposes stated supra in conjunction with the particular computer system. For example, the memory devices may be part of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method of modifying timing data in a circuit having a plurality of interconnected transistors, resistors and capacitors, the method comprising:
    a) running a first simulator on a first netlist of said circuit design to compute a first timing data;
    b) running a second simulator on said first netlist of said circuit design to compute a second timing data;
    c) generating a modified netlist of said circuit by modifying said first netlist;
    d) running said second simulator on said modified netlist to create a third timing data and gradient information; and
    e) by way of said first, second and third timing data in combination with said gradient information, generating an adjusted timing and gradient information for said modified netlist.

2. The method of claim 1, wherein in step b) said second simulator simulates said first netlist with said resistors shorted.

3. The method of claim 1, wherein in step c) said modification of said first netlist further comprises changing transistor widths.

4. The method of claim 1, further comprising creating wire adjustments to account for changing transistor widths to guide an optimizer during iterations until reaching convergence.

5. The method of claim 1, wherein said adjusted timing and gradient information for said modified circuit design is a function of said first and second timing data and transistor widths.

6. The method of claim 5, wherein said function is analytical and differentiable.

7. The method of claim 6, wherein said analytical and differentiable function is an affine function.

8. The method of claim 6, wherein said analytical and differentiable function determines a delay by computing equation:

$$\text{Delay\_Adjust}^k_{sink} = (\text{Gate\_Delay}^{Simulator1} - \text{Gate\_Delay}^{Simulator2}) + \frac{\text{RC\_Delay}^{Simulator1}_{sink}}{C^0_{sink}} \times C^k_{sink},$$

wherein C represents capacitance, k represents number of iteration, and $C^k_{sink}$ represents capacitance at a sink during $k^{th}$ iteration.

9. The method of claim 8, wherein said analytical and differentiable function determines a slew by computing the equation, and wherein each delay is replaced by the slew.

10. The method of claim 6, wherein each analytical and differentiable function determines a delay computing equation:

$$\text{RC\_Delay}^k_i = \text{RC\_Delay}^{Simulator1}_i + \sum_{all\ sinks\ j} (C^k_j - C^0_j) \times \frac{\partial \text{RC\_Delay}_i}{\partial C_j}, \quad (3)$$

wherein i and j are integers, k represents number of iterations, and C represents capacitance.

11. The method of claim 1, wherein said second timing data is computed by said second simulator, wherein simulating said first netlist is performed having selected elements shorted, and which are adjusted to match said first timing data computed by said first simulator on said first netlist in order to have an optimizer sense a correct set of critical timing paths.

12. A method of determining a modified value of at least one delay of at least one wire in a circuit comprising transistors having a plurality of sizes, the method comprising:
    performing a first calculation on said at least one delay of said at least one wire in said circuit, said first calculation including selected elements of said circuit;
    performing a second calculation of said at least one delay of said at least one wire in said circuit, said second calculation omitting said selected elements of said circuit; and
    generating a delay adjustment from said first and second calculations and determining a modified value of at least one load capacitance of said wire.

13. A program storage device readable by a machine, tangibly embodying a program of instructions executable by the machine to perform method steps for modifying timing data in a circuit design formed by a plurality of interconnected transistors, resistors and capacitors, said method steps comprising:
    a) running a first simulator on a first netlist of said circuit design to compute a first timing data;
    b) running a second simulator on said first netlist of said circuit design to compute a second timing data;
    c) generating a modified netlist of said circuit by modifying said first netlist;
    d) running said second simulator on said modified netlist to generate a third timing data and gradient information; and
    e) by way of said first, second and third timing data in combination with said gradient information, generating an adjusted timing and gradient information for said modified netlist.

* * * * *